United States Patent

Pace

[15] 3,696,620
[45] Oct. 10, 1972

[54] MARINE ENGINE WATER COOLING
[72] Inventor: John G. Pace, Port Huron, Mich.
[73] Assignee: Chrysler Corporation, Highland Park, Mich.
[22] Filed: March 24, 1971
[21] Appl. No.: 127,619

[52] U.S. Cl. ............................... 60/321, 123/41.08
[51] Int. Cl. ........................... F01n 3/04, F01p 3/12
[58] Field of Search .............. 60/320, 321; 123/41.08

[56] References Cited

UNITED STATES PATENTS

| 2,060,187 | 11/1936 | Fernstrum | 60/321 |
| 2,757,650 | 8/1956 | Holley | 60/320 |
| 3,283,498 | 11/1966 | Connell | 60/321 |
| 3,358,654 | 12/1967 | Shanahan | 60/321 |

*Primary Examiner*—Douglas Hart
*Attorney*—Talburtt & Baldwin

[57] ABSTRACT

Improved water jacketed manifolds and water cooling systems for marine engines wherein water circulation through the manifold water jacket is provided through an apertured pipe which extends through the jacket.

10 Claims, 5 Drawing Figures

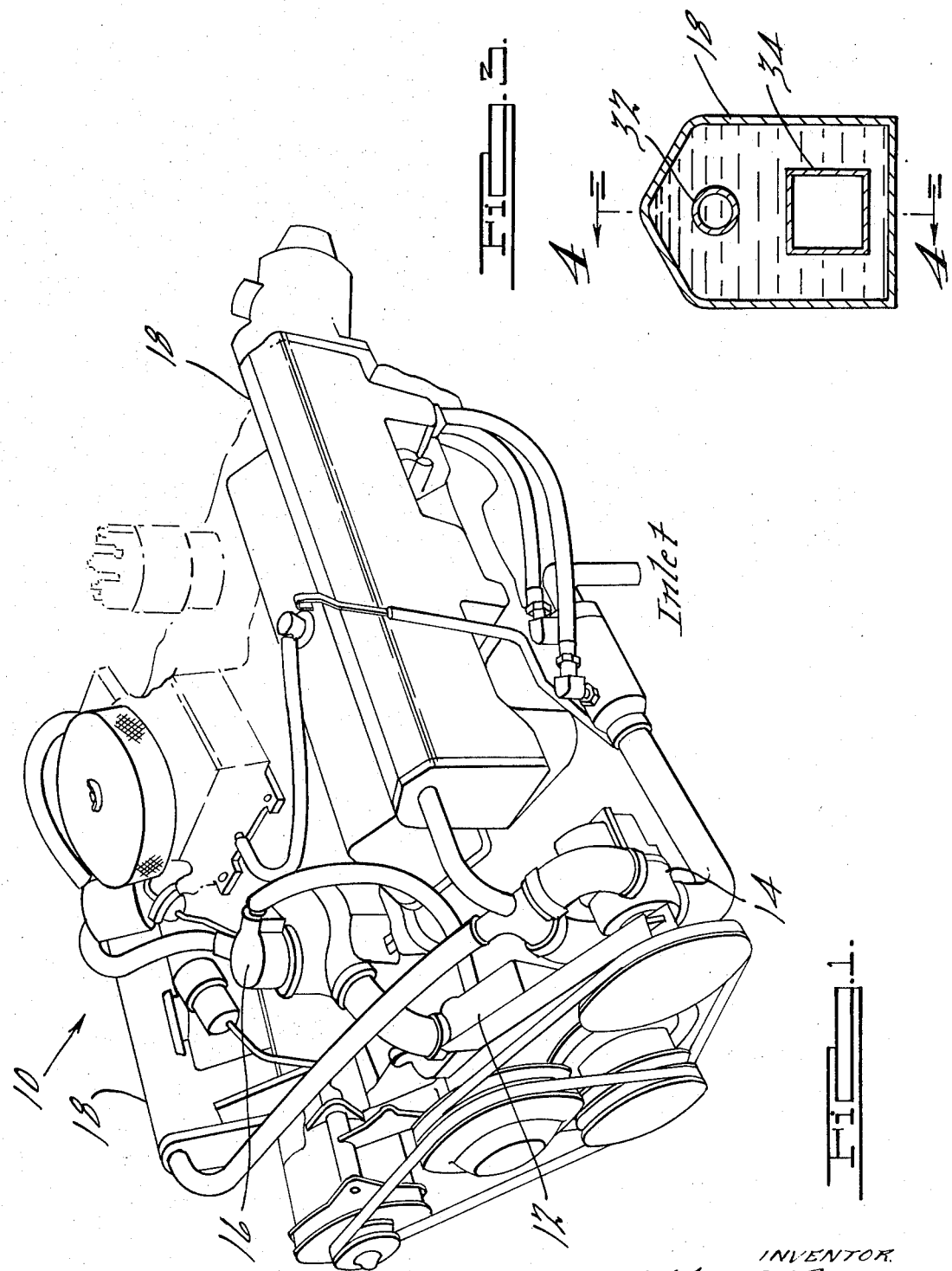

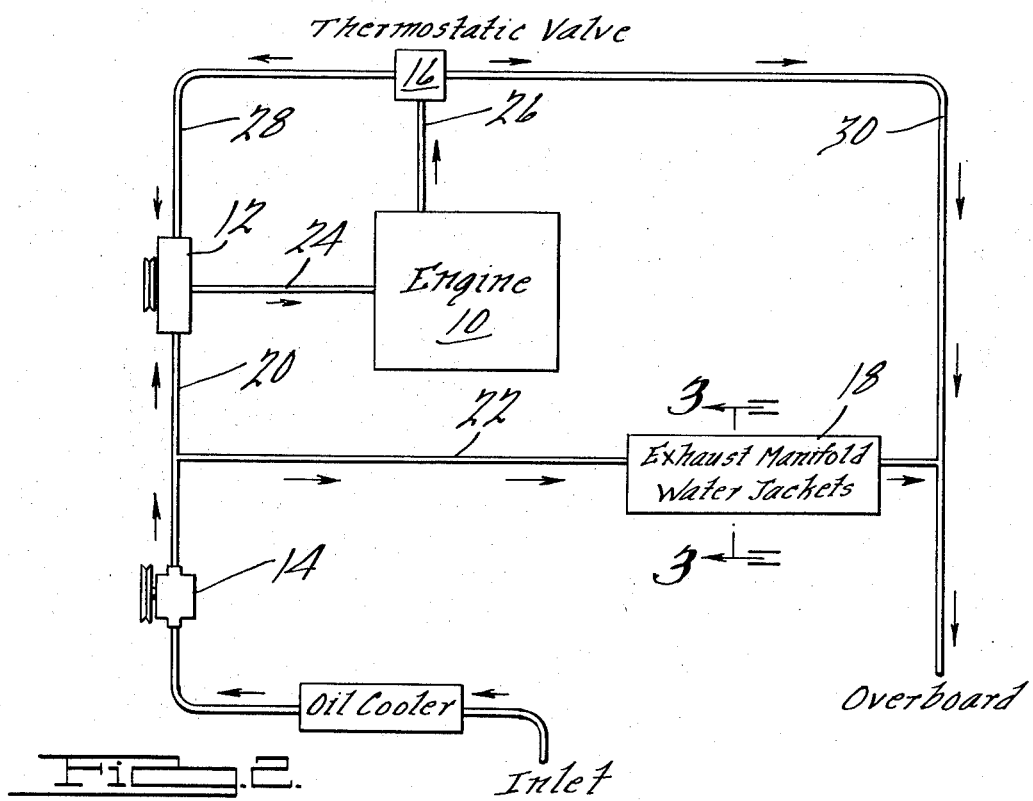
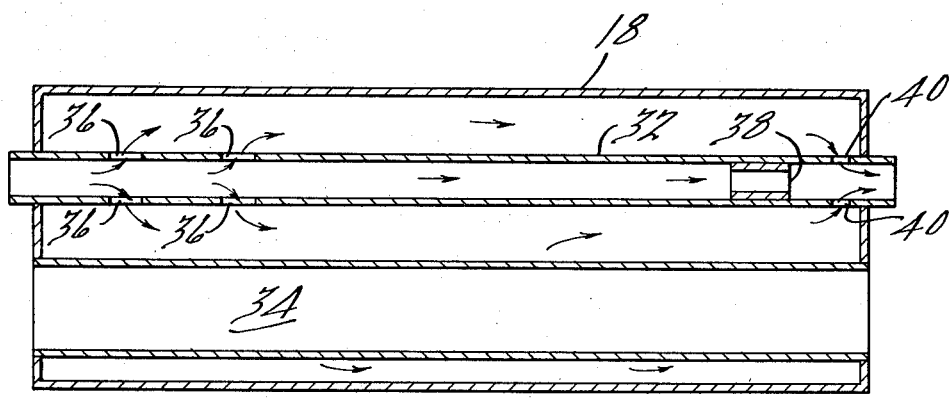
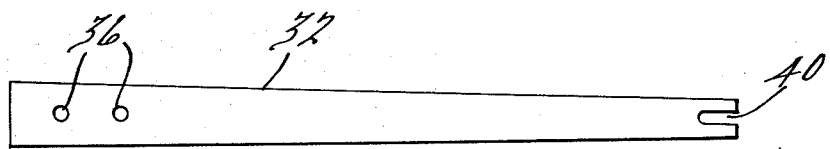

MARINE ENGINE WATER COOLING

BACKGROUND OF THE INVENTION

This invention relates to improved water cooling systems and water jacketed exhaust manifolds for marine engines. Heretofore, water cooling systems have pumped water through engine cooling systems wherein the circulation was controlled by a thermostatic valve. The valve dumped excess water from the system when it reached a predetermined temperature and allowed fresh relatively cool water to be added to the system to replace the dumped water thus lowering the temperature of the water flowing therethrough. Various arrangements have been used to provide cooling flow in the exhaust manifolds.

These systems have tended, under certain weather conditions such as those prevalent in early Spring and late Fall when the raw water is particularly cool, to overcool the manifolds and cause undesirable condensation of water from the exhaust gases to occur therein. The term "raw water" is used herein to describe water just taken into the system but which has not been circulated therethrough. The condensate thus formed tended to drain back into the engine with undesirable side effects. There have been solutions proposed, such as those wherein raw water is pre-mixed with heated water from the cooling system prior to circulating through the manifold. These are satisfactory to varying degrees. However, it is an object of this invention to prevent such condensation by providing a cooling system with anti-condensation features in the exhaust manifold water jackets which differ from the prior art in that only raw water is used to cool the manifolds.

It is a general object of this invention to provide structurally modified water jacketed exhaust manifolds which temper raw cooling water so it will not cool the manifolds to the point at which water is condensed from the exhaust gases.

SUMMARY OF THE INVENTION

This invention provides exhaust manifold water jackets having an apertured pipe extending longitudinally therethrough for carrying water into and out of the water jacket. The apertures allow some of the water flowing through the pipe to enter the jacket proper, flow therethrough and re-enter the pipe, to be subsequently dumped or otherwise disposed of.

BRIEF DESCRIPTION OF THE DRAWINGS

FIG. 1 is a schematic view of a V-8 marine engine having a water cooling system according to the present invention.

FIG. 2 is a schematic diagram of a preferred water cooling system according to the present invention.

FIG. 3 is a cross-section through an exhaust manifold along line 3—3 of FIG. 2.

FIG. 4 is a cross-section through line 4—4 of FIG. 3.

FIG. 5 represents another embodiment of a cooling pipe for the exhaust manifold water jacket according to the invention.

DESCRIPTION OF THE PREFERRED EMBODIMENTS

A marine engine generally designated at 10 is shown in FIG. 1. The engine is equipped with a water cooling system according to the present invention. The cooling system includes an engine water pump 12, a raw water pump 14, a thermostatic valve 16, exhaust manifold water jackets 18, and appropriate conduit means, such as rubber hoses, interconnecting these elements, as shown in more detail in FIG. 2, to provide water circulation therebetween.

Referring to FIG. 2, a water cooling system according to the present invention is shown in more detail but in a somewhat diagrammatic fashion for clarity and convenience. The arrows in the Figure indicate flow paths through suitable interconnecting means. A pump means such as a single pocket pump 14 is arranged to take raw water or the like into an inlet as shown and to provide a flow thereof into lines 20 and 22. The engine cooling system proper comprises a pump, such as centrifugal pump 12, connected to line 20. Pump 12 supplies water to engine 10 by means of line 24 from which water flows to a thermostatic valve 16 through a line 26. When thermostatic valve 16 is closed, water flows through line 28 to pump 12 and is recirculated through the engine. Water circulates through this system cooling the engine until the water exceeds a certain predetermined temperature, such as 140° to 170° F. for example, at which time thermostatic valve 16 opens and dumps some water from the system by means of outlet line 30.

Raw water for cooling the engine manifolds flows through line 22 which extends between pump 14 and the exhaust manifold jackets 18. Manifold jackets 18 are especially fitted according to this invention with a longitudinal pipe 32 extending therethrough for carrying the manifold water flow. Pipe 32 is best seen in FIGS. 3 and 4 which show water jacket 18, pipe 32 and the exhaust gas manifold conduit 34. As can be seen in FIG. 4, pipe 32 is apertured and includes some holes 36 in the wall thereof to allow water flowing through the pipe to enter jacket 18 as shown. Preferably, the pipe contains a restriction as at 38. Further apertures are included in the pipe as shown at 40 by means of which water re-enters the pipe from the jacket to leave the manifold. The restriction is preferred, although not absolutely necessary, because it accentuates the flow of water from the pipe to the jacket and back to the pipe. The restriction may be provided as shown by inserting a sleeve or the like into the pipe or the pipe may be tapered, either locally or over its entire length as in FIG. 5. A local restriction may be located anywhere along the length of the pipe.

Such an arrangement was used in a Chrysler model LM-340 marine engine which is a 340 cubic inch displacement engine of the V-8 type. Pipe 32 was a ¾ inch O.D. copper pipe about 2 feet long and an 0.050 inch thick wall. Two ¼ inch diameter holes were drilled completely through the wall thereof near the inlet end as at 36 in FIG. 4. The restriction was provided by press fitting a ½-¾ inch long piece of copper pipe into pipe 32. It has an I.D. of one-half inch. Two approximately one-half inch wide and 1 inch long slots as at 40, were provided at the other end of the pipe on the other side of the restriction. This structure was tested in a cooling system and found to provide very satisfactory cooling control for the exhaust manifolds.

A cooling system is thus provided according to the invention and by structure of the foregoing type which cools the exhaust manifold at all times but not to the point at which water is condensed from the exhaust gases. At low speeds, hence low flow rates, most of the raw water flowing through pipe 32 travels straight through without much of it entering the jacket proper. At high flow rates, more of the water flowing through the pipe 32 enters jacket 18 further affecting the temperature at which the jackets are maintained. Also, if the pipe is made of copper, brass, stainless steel or the like, a favorable heat exchange relationship will exist between the water flowing through the pipe and the water in the jacket.

Exhaust manifold water jacket 18 has been shown diagrammatically but it is to be understood that the preferred structure is of the standard type as shown in FIG. 3 wherein a central conduit 34 for exhaust gases is surrounded by a jacket 18 through which the water may flow for cooling the manifold and the gases.

Only preferred structures have been described but many equivalent structures are possible as will be apparent to those familiar with this art.

The invention in which exclusive rights or privileges is claimed is described as follows:

1. A cooling system for marine engines comprising:
   pump means for furnishing a supply of water;
   first circulation means connected to the pump means for circulating cooling water to various portions of an engine;
   a water jacketed exhaust manifold;
   a pipe extending longitudinally through the jacket, the pipe having an inlet end and an outlet end and also having a plurality of spaced holes in a wall thereof to allow water flowing therethrough to enter the jacket and re-enter the pipe;
   second circulation means connected between the pump means and the inlet end of the pipe for providing water to the pipe;
   whereby the temperature of the exhaust manifold is controlled and the condensation of water from the exhaust gases is avoided.

2. The system according to claim 1 wherein restriction means is included in the pipe.

3. A water jacketed marine engine manifold comprising:
   a central conduit for carrying exhaust gases from an engine;
   a water jacket surrounding the conduit, and
   a pipe extending longitudinally through the water jacket, the pipe having an inlet end and an outlet end for allowing water to flow therethrough and also having a plurality of spaced holes in a wall thereof to allow water to enter the water jacket and re-enter the pipe.

4. The manifold according to claim 3 wherein restriction means is included in the pipe.

5. The manifold according to claim 4 wherein the holes are positioned to either side of the restriction means.

6. The manifold according to claim 4 wherein the restriction means takes the form of a tapered wall of the pipe.

7. The manifold according to claim 4 wherein the restriction means takes the form of a local restriction in the pipe.

8. The manifold according to claim 3 wherein the pipe is made of a heat exchange material which fosters heat exchange between water in the pipe and water in the jacket.

9. The manifold according to claim 8 wherein the pipe is metal.

10. The manifold according to claim 8 wherein the pipe is copper.

* * * * *